(12) United States Patent
Benedetti (10) Patent No.: US 8,272,322 B2
(45) Date of Patent: Sep. 25, 2012

(54) APPARATUS FOR THE SEPARATION OF VEGETABLE PRODUCTS

(75) Inventor: Luca Benedetti, Ravenna (IT)

(73) Assignee: Unitec S.p.A., Lugo, Ravenna (IT)

( * ) Notice: Subject to any disclaimer, the term of this patent is extended or adjusted under 35 U.S.C. 154(b) by 376 days.

(21) Appl. No.: 12/509,030

(22) Filed: Jul. 24, 2009

(65) Prior Publication Data

US 2010/0029351 A1 Feb. 4, 2010

(30) Foreign Application Priority Data

Jul. 29, 2008 (IT) .............................. PN2008A0064

(51) Int. Cl.
*A23N 15/02* (2006.01)
*B65G 51/01* (2006.01)

(52) U.S. Cl. ............... 99/638; 99/637; 99/643; 460/125

(58) Field of Classification Search .................... 99/638, 99/637, 643, 536, 537, 538; 15/3.13, 3.11; 460/123, 125, 126
See application file for complete search history.

(56) References Cited

U.S. PATENT DOCUMENTS

| | | | |
|---|---|---|---|
| 3,447,544 A * | 6/1969 | Vergara | 134/60 |
| 3,918,116 A * | 11/1975 | Valdespino | 15/3.13 |
| 4,517,099 A * | 5/1985 | Breckner | 210/741 |
| 4,913,044 A * | 4/1990 | Heath | 99/494 |
| 5,039,534 A * | 8/1991 | Adams et al. | 426/231 |
| 7,472,648 B2 * | 1/2009 | Blanc | 99/637 |

FOREIGN PATENT DOCUMENTS

| | | |
|---|---|---|
| EP | 1914183 | 4/2008 |
| FR | 2820287 | 8/2002 |
| FR | 2820413 | 8/2002 |

\* cited by examiner

*Primary Examiner* — Reginald L Alexander (74) *Attorney, Agent, or Firm* — Shoemaker and Mattare (57) ABSTRACT

An apparatus for separating objects, such as cherries, that are joined together by removable links, includes a collecting vessel having a water inlet and into which the objects are conveyed by means separate from the water inlet. One or more conduits extend downstream from the collecting vessel and have respective inflow mouths situated downstream of the collecting vessel. Water pumps within the conduits cause liquid to whirl about with the products taken in therewith, and pump them into the respective outflow mouths so as to eject them. The collecting vessel is a tank whose wall facing the inflow mouths has an upper edge adapted to perform as a horizontal spillway. The upper edge is situated higher than the inflow mouths, and a chute between the upper edge and the inflow mouths causes the liquid and the objects to converge towards the inflow mouths. Preferably, water ejected from the conduits is recovered and recycled.

7 Claims, 5 Drawing Sheets

APPARATUS FOR THE SEPARATION OF VEGETABLE PRODUCTS

The present invention refers to an improved apparatus for separating vegetable products, such as for instance cherries, small tomatoes in tufts or bunches, and the like, which have been previously picked and are still clustered into small bunches or tufts or are joined together by their own stems, as this is in particular the case for cherries.

These vegetable and fruit products are largely known to be by now mostly grown and produced on an industrial scale to be then marketed through the networks of the so-called large-scale retail trade; therefore, for them to be adequately prepared in view of such use, these products must usually undergo corresponding treatment and processing, in which—among other things—they are washed and cleaned, separated when they are still joined together in bunches, tufts or clusters, weighed, calibrated, sorted out based on pre-determined characteristics or properties thereof, such as colour or hue, ripening degree, and the like.

To this purpose, said products are caused to undergo corresponding processes of an industrial kind, which are carried out by specially designed equipment and according to specially designed methods.

Of course, one of the first actions that has to be taken, i.e. carried out on such products, in the case that they are still joined together in bunches, tufts or clusters, is having them duly separated from each other.

It is exactly this requirement that has given rise to the need for equipment and processes of an industrial type to be developed and provided to cope with such duty.

Known for example from the disclosure in the patent specification FR 2820287 to Fachaux is a method, and a related apparatus, which is adapted to separate cherries that are joined together by their own stems.

The apparatus described in the above-cited patent comprises:
- a main tank that is continuously filled with a mass of water being let thereinto and containing—dispersed therein—the cherries to be separated,
- a water-carrying conduit that is fluidly communicating with said tank and takes in said mass of water along with the cherries contained therein,
- a pump that sucks in said mass of liquid and causes it to whirl inside said conduit, so that, owing to the centrifugal force imparted to the cherries joined together by common stems, the same cherries are able to separate from each other,
- means for recovering and transferring the separated cherries, and
- means for re-circulating the water, so as to be able to use it within a closed-loop cycle.

According to the above-cited patent publication, the cherries that are let into the tank are coming from a conveyor belt, on which they are generally levelled out and, therefore, just partially singularized.

However, when they are then poured into the tank, they tend to gather again into a cluster on the bottom of the tank; this circumstance, jointly with the fact that said conveyor belt has no capacity or facility to singularize the cherries it is carrying, but just to slightly improve the uniformity of the way in which they are poured into the tank, gives rise to the well-known kind of drawback that the cherries, when they are sucked in from the bottom of the tank and caused to whirl inside the separation conduit, they are still heaped up to quire remarkable an extent.

The ultimate effect, which all those skilled in the art is on the other hand well aware of, is that the separation action becomes more difficult and uncertain due to the high density of cherries inside the conduit.

It can be in fact most readily appreciated that the separation action becomes much more effective if the tufts of cherries are present not only in an appropriately singularized form, but also adequately spaced from each other so as to prevent them to interfere with ach other inside said conduit.

In other words, the fact that the cherries are sucked in from the bottom of the tank when they are still in a heaped-up state and, as a result, are let in such state into the conduit where they are caused to flow into a whirl, has the effect of worsening the separation process to a remarkable extent.

Known from the disclosure in the patent publication FR 2820413, again to Fachaux, is an apparatus that, by its construction, mode of operation and purposes, is fully similar to the above-described one. The sole difference between the two embodiments lies in the fact that, while cherries are flowing in from a conveyor belt that pours them in bulk, i.e. loosely into the tank in the previous case, the cherries are in this case poured onto a rotating wheel provided with small niche-like recesses, in which the cherries are able to be received in a nearly orderly manner.

In practice, such rotating wheel performs in the way of singularizing the tufts of cherries and, for the matter, it can also be acknowledged that this occurs, actually, albeit only partially.

However, even in this case the cherries are ultimately poured into the tank by falling off the wheel, so that they tend again to heap up onto the bottom of the collecting vessel, from which they will then be sucked in to be whirled and, hence, separated.

Therefore, when they are poured into the tank, they end up by concentrating onto the bottom thereof to eventually regain a heaped-up state.

As a result, the beneficial effect of the partial singularization job performed by the rotating wheel is fully thwarted eventually.

Briefly, the same drawbacks are basically experienced here as in the previously considered case.

Also known from the disclosure in the U.S. Pat. No. 5,918,819, to Inter-Nevett Ltd., is an apparatus for separating and processing parts of vegetable products; this apparatus, however, is practically intended to enable the peel of the same products to be separated from the flesh, i.e. the inner pulp thereof, and this separating process takes place not only through a first whirling action, but also through a specific surface grazing action, i.e. an action implying surface abrasion of the products.

As it can be readily appreciated, such apparatus is simply unsuited for use to purposes falling within the scope of the present invention, since the cherries would be completely damaged and spoiled by such process, whereas the purpose of the inventive apparatus lies on the contrary in separating the cherries from each other while preserving a maximum extent of integrity of the products both inside and at the surface thereof.

Known from the disclosure in patent application EP 1 914 183 A1, again to Fachaux, is an apparatus provided to align products, in particular vegetable ones, and especially cherries, which is comprised of a collecting tank (108) that includes at least one aligning channel (112), water supply means letting water into said collecting tank via a water inlet channel (156) that ends up at a point situated upstream to said channel (112), and an arrangement (150) for the delivery of said vegetable products, which is provided separately from said water supply means and comprises a reservoir (104) that is filled with both water and said vegetable products, as well as a kind of decanting arrangement adapted to remove the products from said reservoir (104) and transfer them to a point situated upstream to, i.e. at the inlet of said channel (112).

Prior to them being in this way caused to flow into the collecting tank, said vegetable products are sucked in and disentangled, i.e. untwined and loosened, into a disentangling channel operated by a water pump (202) that lets the mass of water containing the products still in the unprocessed state thereof (i.e. as they have been gathered after picking) into appropriate separating means, such as net-like sliding belts (110), which perform in a twofold manner in that:

they allow water to be separated from the products, and transfer said products into said collecting tank (108).

Such apparatus, although it may theoretically appear to be quite effective in aligning products, practically turns out as being of little use, actually, since it by no means ensures that the disentangling action attempted by the pump (202) is really sufficient to have the products separated from each other, so that the same products may occur to be let into said aligning channels in a state in which they are still joined together.

The action of said channels is therefore limited to aligning said products, i.e. ranging them in a line, wherein said products, if they come to be in a still tufted, i.e. clustered state inside said collecting tank (108), will however remain in such state even during the passage thereof through said channels, as well as downstream therefrom, since these channels are fully ineffective, i.e. can do nothing in view of having said products separated from each other.

A separation might be brought about by the means and in the manners described in the afore-cited patent FR 2820287. But this would anyway still imply the afore-mentioned drawbacks that are due to the products heaping up onto the bottom of the collecting tank just upstream to the suction and whirling conduit.

It would therefore be desirable, and it actually is a main object of the present invention, to provide an apparatus for separating products, in particular vegetable products, which is adapted to make use of the technique based on whirling the same products in a stream of water being let into a conduit jointly with said products, wherein ways and means are provided, which are effective in enabling the products, or groups of products, to be already arranged in a proper sequence at the inlet side of said conduit, in such manner as to enable the following whirling action to act on a group of products at a time, i.e. on groups of products that are not only singularized, but also properly spaced from each other.

According to the present invention, these and further aims are reached in an apparatus, which incorporates the characteristics and features as recited in the appended claims.

Anyway, features and advantages of the present invention will be more readily understood from the detailed description of an exemplary embodiment that is given below by way of non-limiting example with reference to the accompanying drawings, in which.

While reference is specifically made in the following description to an apparatus for the separation of tufts of cherries that are joined together by their stems, it will be appreciated that the invention is to be understood as applying to any type or kind of objects in general and, in particular, to other kinds of vegetable products that are joined together by removable links.

Use will also be made in the following description of the term "fluid current conveyor", which shall be understood as meaning both an either physically existing or even virtually provided conduit that is adapted to convey a fluid medium, typically water, in which there are dispersed other solid bodies duly separated from each other, and a simple stream of a fluid medium containing and conveying said bodies, irrespective of containment walls for such stream physically existing or not.

With reference to FIGS. 1, 2, 3 and 5, an apparatus according to the present invention comprises:

a collecting vessel 1, in which the cherries are stored prior to them being started off to the actual separation process, one or more conduits 2, 3, 4 located downstream from said collecting vessel, into which respective flows of water are let from respective inlet mouths 2A, 3A, 4A, said flows of water carrying—in a dispersed state therein—the objects or products to be separated, respective hydraulic or water pumps 2B. 3B, 4B fitted in the respective ones of said conduits and adapted to generate a circular whirling stream thereinside, which is effective in separating said objects or products from each other owing to, i.e. by the action of the centrifugal force being generated, in a manner as is generally known in the art, such as described for example in the two French patents cited afore, respective outlet mouths 2C, 3C, 4C of said conduits, from which both the water and the cherries entering said conduits are ejected outside, as pumped off by said respective pumps 2B, 3B, 4B.

In this connection, it may be also appropriate to specially notice that said pumps perform a twofold duty, i.e.:

they suck in and take the water and the cherries into said respective conduits to eventually eject them outside, and they concurrently generate the whirling stream inside said respective conduits.

It should be specially stressed at this point that a purpose of the present invention is to disentangle the cherries prior to them being introduced in the specially provided separating conduits, i.e. separate each tuft or bunch of cherries from each other wherever they may be in a tangled state (this process is generally referred to as "singularizing" in the technical parlance), and—above all—to cause them to move in such manner as to enable each tuft or bunch to be introduced in the respective conduit by keeping a certain distance, i.e. as duly spaced from both the preceding tuft of cherries and the following one.

To this purpose, according to the present invention use is made of a fluid current conveyor to carry a constant flow rate of water, in which the cherries to be separated are dispersed, along with the principle that, for the various tufts of cherries to be separated, i.e. spaced out from each other, the need arises for the cross-section of said conveyor to be sensibly reduced, which in turn immediately causes the flow velocity thereinside.

In fact, if the flow rate is constant, reducing the cross-section of the fluid current conveyor gives rise to a natural increase in the flow velocity therethrough, and, if said tufts of cherries lie heaped up close to each other in a fluid current conveyor moving at a very slow velocity, then, when such velocity increases, the distance between the same tufts of cherries is naturally due to increase.

Such effect may be both verified experimentally and readily accepted if it is considered that the transit time of two successive bodies in a generic cross-section of a conduit, through which a fluid current conveyor is caused to move, does not vary if the cross-section of said conduit varies, e.g. becomes narrower. In this case, in fact, the flow velocity is due to increase accordingly; however, owing to the transit time having to be constant (due to the fact that the flow rate is constant), it is the distance between said bodies that must therefore increase.

The relation $t=S/V$ applies in fact in this case, where t is the transit time of the two successive objects or bodies, S is the distance therebetween, and V is the (unvarying) velocity thereof.

Since—as stated above—transit time of and between the two successive bodies is constant, if the velocity of the fluid current conveyor is increased, also the distance S between said two successive bodies is due to increase accordingly.

Figure 2:
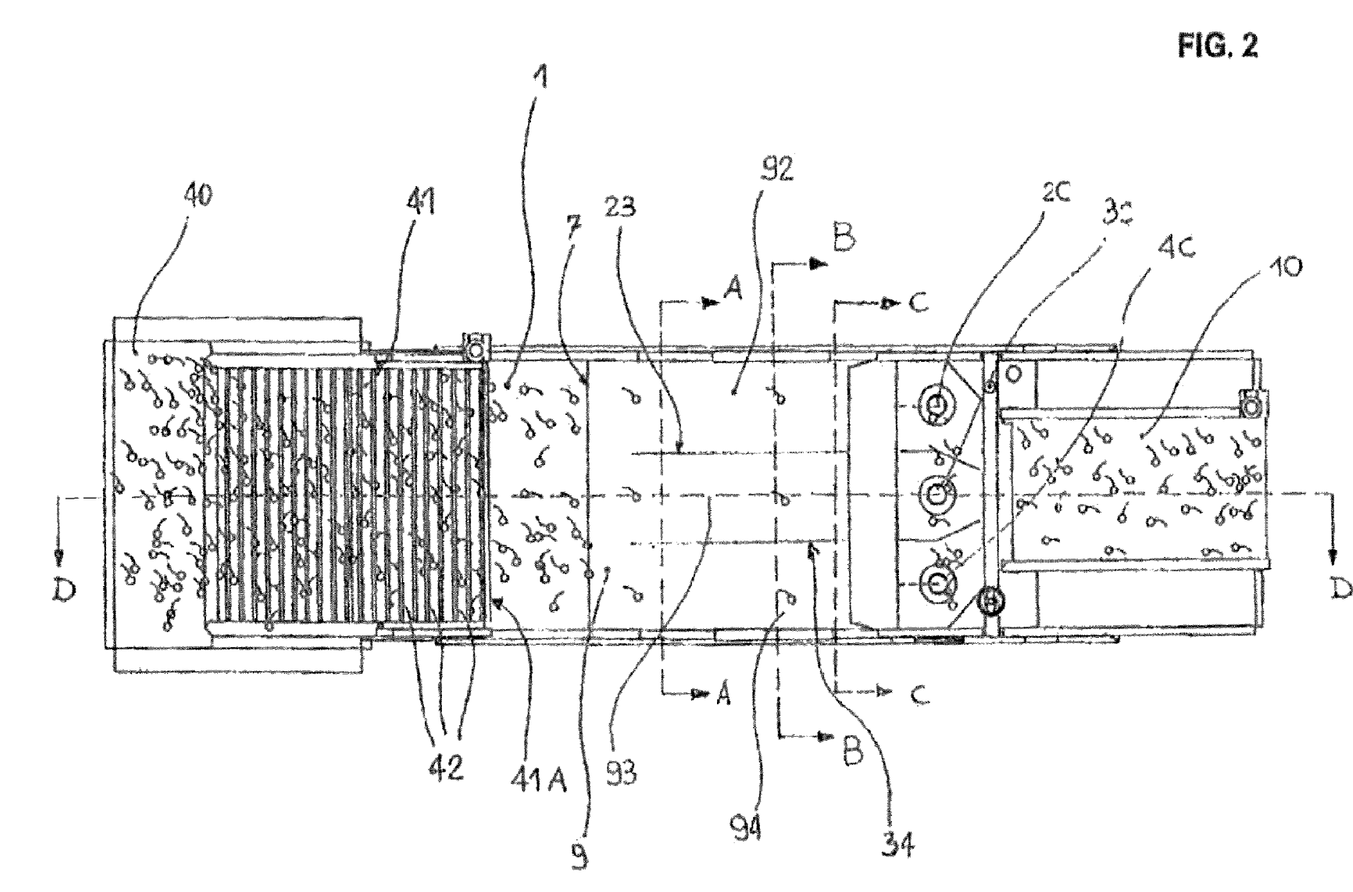
FIG. 2 is a top, planar-projection view of the apparatus shown in FIG. 1.
Figure 3:
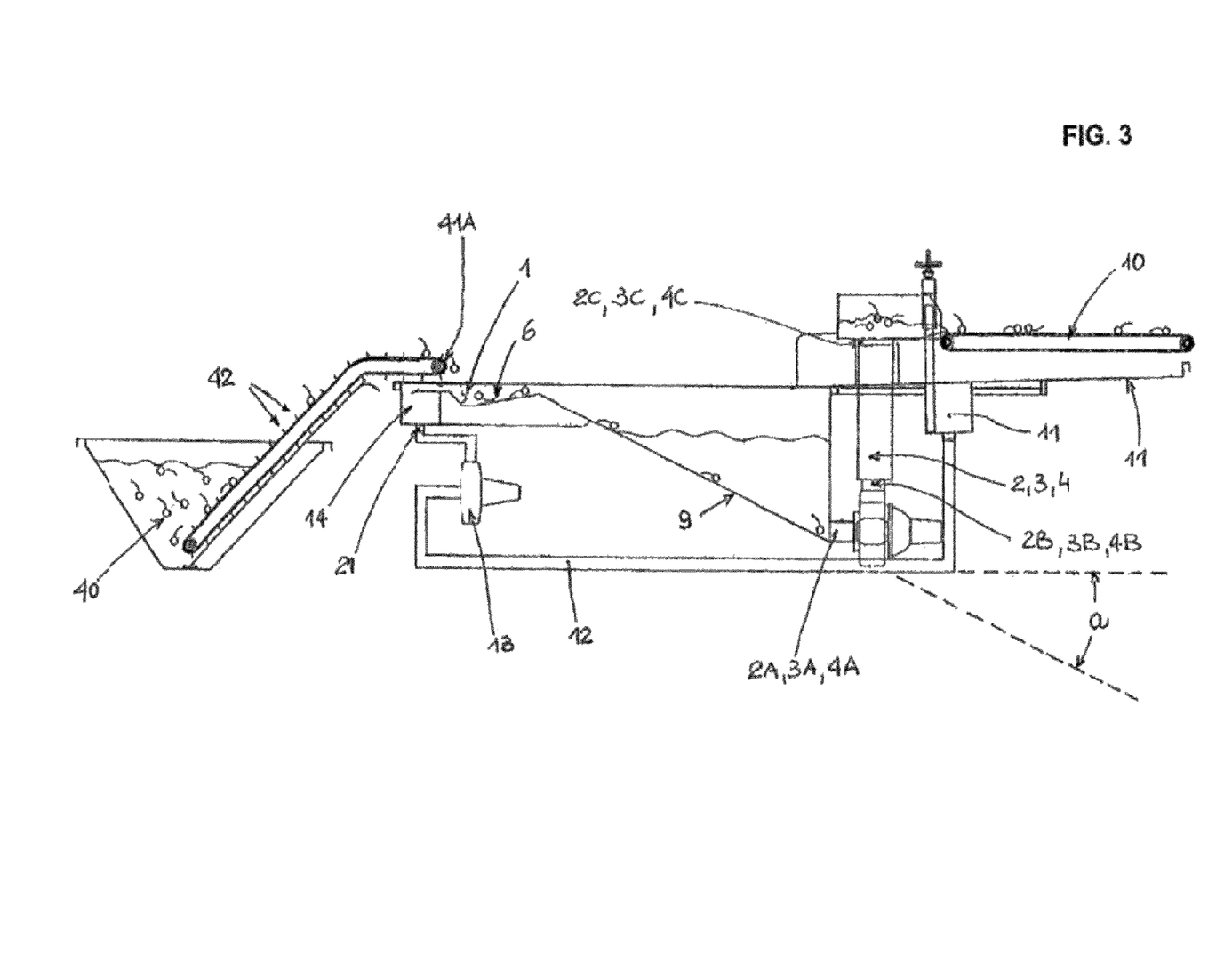
FIG. 3 is a longitudinal and vertical, planar sectional view—extending orthogonally to the view in FIG. 2 and parallel to the direction of movement of the products—along the sectional plane D-D of FIG. 2.
Figure 4A:
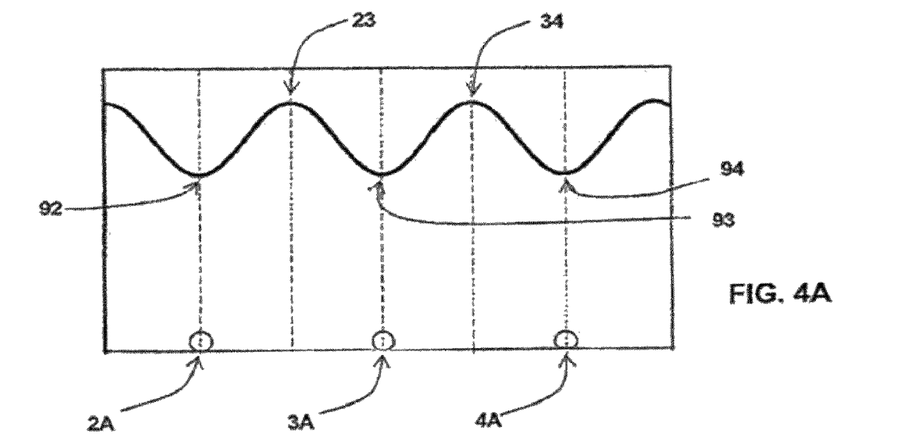
FIGS. 4A, 4B and 4C are views of a portion of the apparatus according to the present invention along the sectional planes A-A, B-B and C-C of FIG. 2, respectively.
Figure 4B:
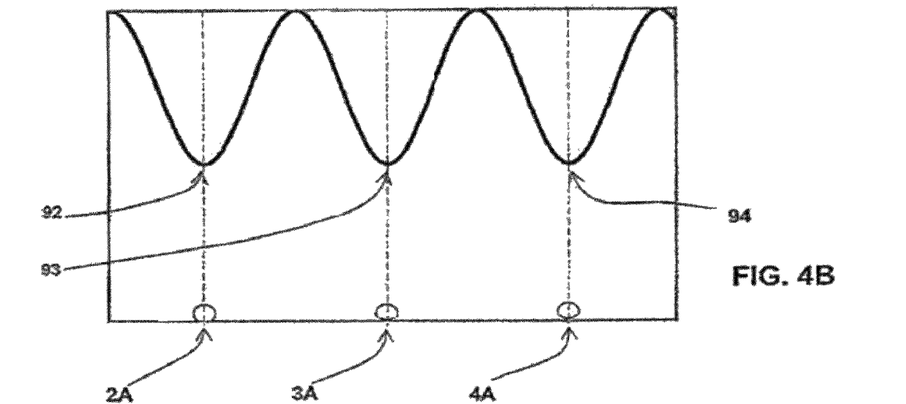
Figure 4C:
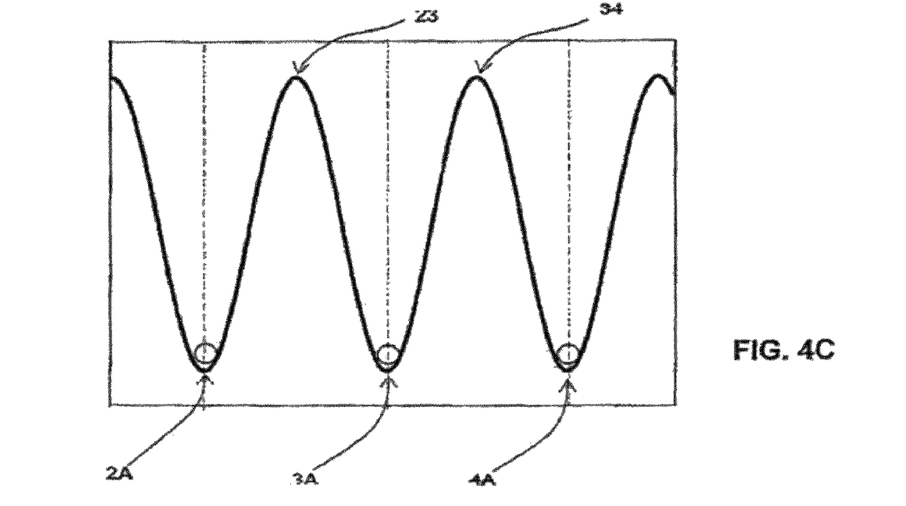

As a result, for the distance between the tufts of cherries to be increased, the collecting vessel 1, from which said conduits are supplied, is not provided in the form of a conventional tank, onto the bottom of which said cherries are first poured and then sucked off, but is rather provided in the form represented:

in FIG. 3, which shows a vertical sectional view thereof along a sectional plane running parallel to the direction of movement of the fluid current conveyor, and in FIGS. 4A, 4B and 4C, which are symbolical views of three respective planar sections extending parallel, vertical and orthogonal to the sectional plane of the preceding FIG. 3, as referred to the section planes A-A, B-B and C-C of FIG. 2, respectively.

It should be noticed that said collecting vessel 1 comprises a middle tank 5 having preferably an elongated shape in the form of a shallow, broad trench arranged orthogonally to the direction of movement of a water stream flow carrying the cherries dispersed therein.

Figure 5:
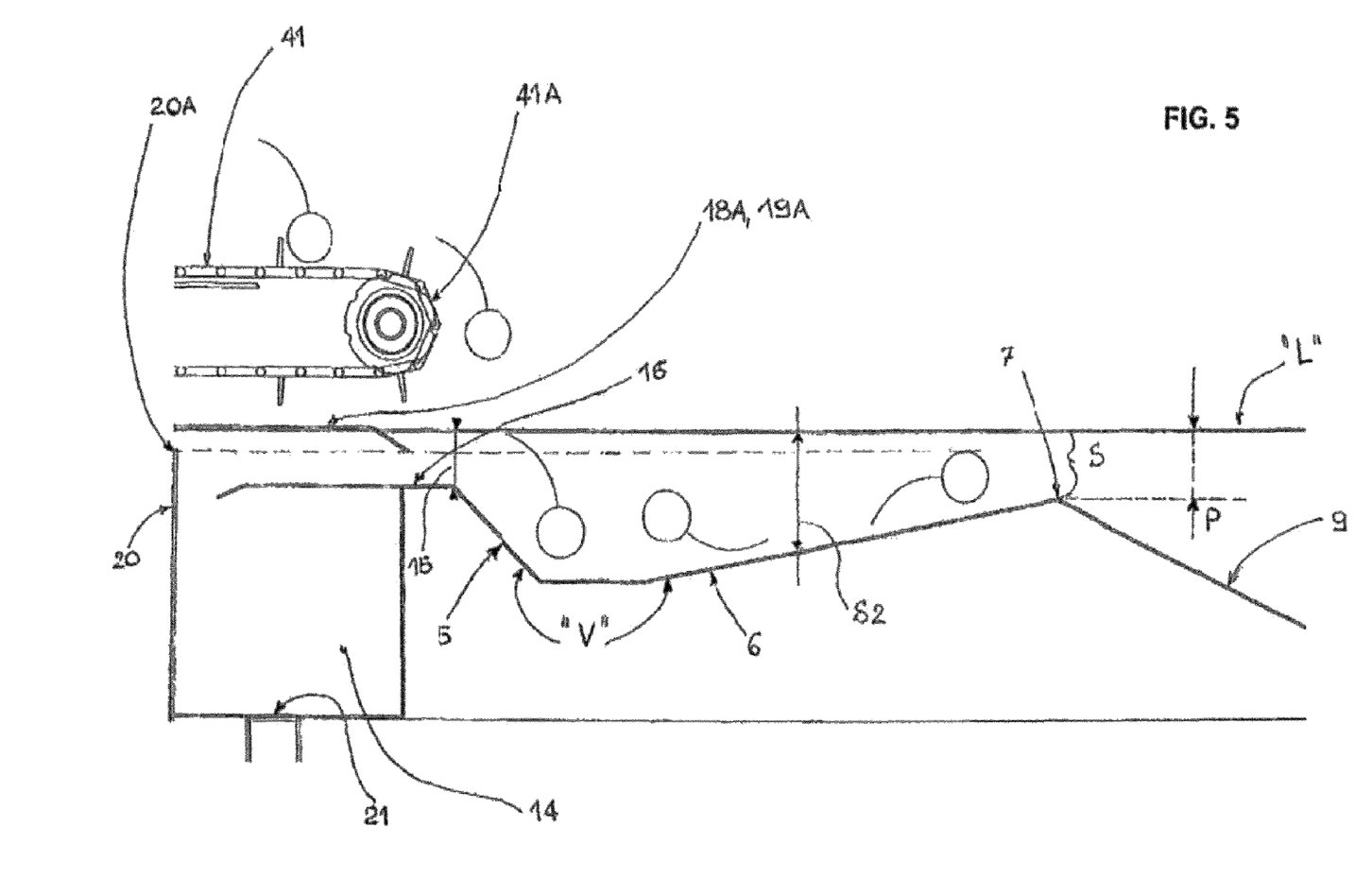
FIG. 5 is an enlarged view of a portion shown in FIG. 3.

With reference to FIG. 5, the terminal portion of the wall 6 defining the downstream portion of said tank 5, and facing said mouths 2A, 2B and 2C, is inclined upwards and is provided with an upper edge 7 that does not rise up out of the bath contained in said tank 5, but remains rather immersed up to a depth, i.e. distance P from the free surface L of the bath contained in said tank 5.

The way in which such bath is supplied and kept at a pre-defined height, i.e. the way in which the related fluid current conveyor is brought about, shall be described and explained further on in this description.

Attention is for the time being simply drawn to the fact that, if such depth P is sufficiently small, said edge 7 is able to perform as a kind of spillway, in the sense that it defines a passage thereabove, whose cross-sectional area is much more limited than the average passage cross-section area of the tank.

An immediate consequence of this circumstance is that the velocity of the fluid current conveyor when flowing across said upper edge increases to a significant extent, in a manner that is generally known as such, so that the objects to be separated, i.e. the cherries that are still joined together, flowing across said edge are ultimately pushed away, i.e. spaced out from each other, thereby reaching the main aim of the present invention, owing to the afore-explained effect.

So as described above, the present invention allows at this point for a number of advantageous improvements and related useful embodiments, as explained below.

Figure 1:
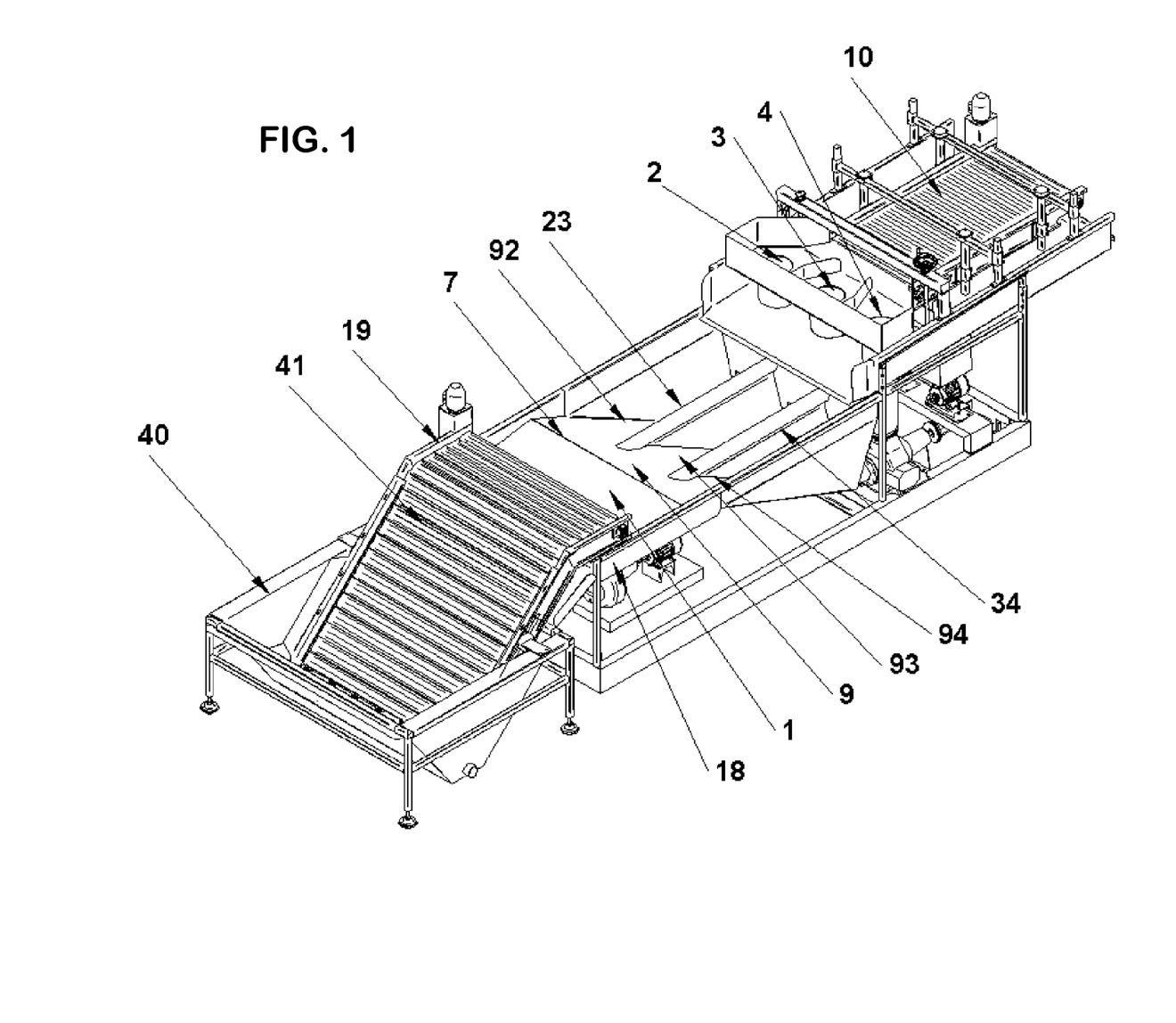
FIG. 1 is a perspective view of an apparatus for separating and spacing out vegetable products according to the present invention in a preferred embodiment thereof.

1) With reference to FIGS. 1, 3 and 5, it has turned out as being advantageous that such downstream wall portion 6 is not provided to rise up abruptly, but rather features a ramp that is inclined downwards from said upper edge 7 to the bottom of the tank 5; it has been in fact found that such feature enables the tufts of cherries to become arranged in such order as to move over said edge 7 one at a time or, anyway, in a much more orderly manner, since in this case, owing to its cross-section area decreasing progressively, the velocity of the fluid current conveyor increases gradually, as well; as a result, the cherries are progressively spaced out even before they reach and move over said edge 7.

2) With reference to FIGS. 1, 2 and 3, for such spacing out effect of the tufts of cherries from each other, as it has just been brought about in the manner described above, to be able to be used to best advantage, while doing away with any risk for them to come together again, in which case the invention would in fact be practically thwarted, said fluid current conveyor is led to flow immediately into said inlet mouths 2A, 3A, 4A and, as a result, the associated conduits for the individual cherries to be separated from each other.

For such immediate action to be obtained, between said upper edge 7 and said inlet mouths 2A, 3A, 4A there is provided a chute 9, which uses the force of gravity as the propulsive means hereof and, therefore, has its entry or inflow zone, which by the way coincides with said upper edge 7, lying at a higher level than the level of said inlet mouths 2A, 3A, 4A. In addition, said chute 9 has a substantially constant and, anyway, continuous slope, so as to do away with any risk of the various tufts of cherries coming undesirably together or running close to each other again.

In this way, as soon as it moves over said upper edge 7, the fluid current conveyor is immediately directed towards said inlet mouths, so that the various tufts of cherries are let thereinto in a form in which they are not only singularized, but also spaced out from each other from a geometrical point of view, even if not in time.

3) Another improvement lies in the fact that said chute 9 can be formed to terminate into a plurality of separate funnels or channels 92, 93, 94, which flow with the lower and narrow portion thereof directly into the respective ones of said inlet mouths 2A, 3A, 4A leading to the respective conduits 2, 3 and 4, as this is schematically shown in FIGS. 1, 2, 4A, 4B and 4C, which show how said funnels, or channels, are inclined downwards by a certain angle a (see FIG. 3), so that the lower end thereof also corresponds to the narrowest section thereof, which leads into the respective inlet mouth 2A, 3A, 4A.

Being formed in this way, the pair of contiguous funnels 92 and 93 is therefore separated by a partitioning contour 23 and, similarly, the pair of contiguous funnels 93 and 94 is in turn separated by a respective partitioning contour 34.

This peculiarity, in fact, not only allows the individual tufts of cherries to be spaced out, but also enables them to be aligned along the inlet section of the conduit, so that controllability of the following separation process is clearly improved.

4) With reference to FIGS. 1, 2 and 3, another improvement can be obtained if said conduits 2, 3, 4 . . . are provided in a vertical arrangement, so that the outlet mouths 2C, 3C, 4C thereof come to be situated on top of the related conduits; in this way, the fluid current conveyor debouches, i.e. flows out into the open to immediately fall downwards again.

According to this improved embodiment, below said outlet mouths there are arranged appropriate net-like sieve means 10 adapted to retain the cherries and send them—with the aid of means largely known as such in the art—towards the following stations for subsequent processing, while the water passes through the meshes of said net-like sieve means to be eventually recovered.

Advantageously, said net-like sieve means 10 may be provided in the form of a first moving conveyor belt, as this is largely known as such in the art.

5) A yet further improvement relates to the manner in which the water passing through the meshes of said net-like sieve means 10, which—as stated above—may be in the form of a moving conveyor belt, is recovered for reuse. With reference to FIGS. 1 and 3, below said net-like sieve means there is specially arranged a proper recovery tank 11, so that the water falling from the sieve can be collected thereinto.

From this recovery tank, the water collected therein is delivered again into said collecting vessel 1 via an appropriate water-recovery conduit 12.

Briefly, the water used throughout the above-described separation process is practically circulated in a closed-loop cycle, so as to ensure readily appreciable saving effects.

However, this can only be done if the level of the recovery tank 11 is sufficiently higher than the level of the collecting vessel 1.

6) Should this not be the case, e.g. owing to practical construction constraints, or due to the pressure in said water-recovery conduit being too low, adequate water circulation in said water-recovery conduit 11 might be advantageously ensured by the provision of a suitable recovery pump 13.

7) To the purpose of having said collecting vessel continuously supplied with water being circulated in a closed-loop cycle, and with reference again to FIGS. 1, 3 and 5, upstream to said collecting vessel 1 there is provided a so-called transfer chamber 14, which shall meet following conditions:

it must be open on top;

said water-recovery conduit 12 shall be such as to debouch with an outlet mouth 21 thereof onto the bottom of said transfer chamber and, therefore, the latter is supplied with water flowing in from the recovery tank 11;

it must be connected with said collecting vessel 1 via an upper flow-way 15, which is also open on top, and is delimited on the bottom by a roughly planar side or a corner 16, whose upper edge or end is sensibly horizontal;

and the related side walls 18, 19 and bottom wall 20 (i.e. the wall lying on the opposite side of said upper edge 7) must have their own upper edges 18A, 19A and 20A, respectively, situated at a level that is sufficiently higher than the level at which said upper edge 7 of said collecting vessel 1 lies.

The reason behind this particular requirement is readily apparent to all those skilled in the art and can be summarized as follows: in fact, in order to ensure that the flow of water from said transfer chamber 14 to said collecting vessel 1 is able to reach up such level as to flow over said upper edge 7, thereby causing the latter to perform as a spillway in the desired manner, the need arises for said flow to be ensured that it cannot spill over out of the collecting vessel 1 before it reaches up to and flows over said level of the upper edge 7 (principle of communicating vessels).

Now, such condition is of course only possible if the levels of the upper edges 18A, 19A, 20A of said walls 18, 19 and 20 are adequately higher than the level of said upper edge 7.

8) With reference to FIG. 5, it can be noticed that the distance of the free surface L of said fluid current conveyor, i.e. the flowing aggregate of liquid and objects, to said upper edge 7 defines—with said same upper edge 7—a passage or, better, a spillway S, the cross-section area of which is sensibly narrower than the average cross-section area S2 of the collecting vessel 1.

As far as the present invention is concerned, this is a basic requirement to be complied with. In fact, a reduction in the cross-section area of the fluid current conveyor may be brought about in either one of two manners, i.e. either by reducing the depth or by reducing the width thereof.

The last-mentioned possibility, however, does not seem to be advantageous, since the vegetable products would be caused to pile up in a restricted space under the risk of overlapping each other, i.e. piling up, and, as a result, bringing about an undesired entangling effect, whereas it is just such effect that should desirably be avoided.

Accordingly, the desired reduction in the cross-section area of the flow-way of said fluid current conveyor is brought about by exactly adjusting the height of said upper edge 7 in accordance with the other parameters, especially the flow rate of such conveyor, which determines the height of said free liquid surface L.

9) Referring again to FIG. 5, u further improvement is obtained if the contour of said collecting vessel 1, as viewed along a section oriented in the flow direction of the liquid stream, is in the shape of a V open on top or, anyway, a markedly concave shape.

In addition, the means used to load the vegetable products, as preferably comprised of a conveyor belt 41, are so positioned as to ensure that the vertical of the release edge 41-A thereof is precisely centred on said concave-shaped or even V-shaped contour.

Such combined embodiment allows the vegetable products, when dropped into the collecting vessel, to plunge into the deepest region thereof, actually, so that they are practically prevented from incurring the risk of being damaged by possibly impinging against the bottom of the same vessel 1.

10) With reference to FIGS. 1, 2 and 3, the above-mentioned product loading means comprise:

a loading tank 40, in which the vegetable products are poured in bulk, i.e. loosely, a conveyor belt 41, which is provided on its outward facing surface with a plurality of seizing means 42, each one of which being adapted to engage a respective vegetable product, and which has an end portion thereof extending deep into said loading tank 40.

The initial slope of said conveyor belt, as well as the inclination and the size of said seizing means 42 must be selected so that they are able to only engage one of said vegetable products at a time, so that other products that may be possibly linked with one of the products being engaged are caused to separate therefrom to fall back into the tank, so as to enable them to be then re-engaged by a following one of said seizing means.

This again enables the vegetable products to be arranged and distributed in a more orderly and uniform manner on said conveyor belt 41, thereby assisting them in dropping in a more uniform manner into said collecting vessel 1 and—ultimately—flowing over said upper edge 7 in a more orderly manner, so as to further enhance the effectiveness in singularizing and spacing out the same vegetable products at the inlet of said conduits 2, 3, 4.

11) Still a further improvement relates to the possibility for the various above-described functional devices and parts of the apparatus, such as in particular said moving conveyor belt 41, said suction pumps 2B, 3B, 4B . . . , and said pumping means 13 in said water-recovery conduit 12, to be controlled, adjusted and operated as flexibly, selectively and optimally as possible, as well as the manner in which this can be done.

In fact, the possibility for said functional devices and parts of the apparatus to be controlled and adjusted in a flexible manner enable the operation thereof to be adapted or conformed to:

the characteristics of the vegetable products being handled, such as in particular the nature, shape and size thereof, the amount of produce being fed per unit of time to the apparatus according to the present invention.

It can be most readily appreciated that such possibilities are effective in dramatically increasing the flexibility and the utilization range of the apparatus, thereby improving the utility value and—ultimately—the economic value thereof.

On the other hand, providing such control and adjustment systems and means is within the ability of all those skilled in the art, so that no need arises to have them explained any further, actually.

The invention claimed is:

1. Apparatus for the separation of objects that are joined together by means of a removable link, in particular fruit and vegetable products, such as for example cherries as joined together by their stems, comprising:
    a collecting vessel adapted to contain said products and a liquid in which said products are immersed,
    one or more conduits extending downstream from said collecting vessel,
    a respective inflow mouth situated at an end portion of each said conduit downstream from said collecting vessel and accessible from the latter,
    pumps located inside respective ones of said conduits and adapted to cause the liquid to whirl about jointly with the products, and to pump them into the outflow mouths at the respective opposite end portion thereof, so as to eject them therefrom,
    wherein said collecting vessel has a wall facing said inflow mouths which has an upper edge adapted to perform substantially as a spillway upstream of said pumps,
    said upper edge being situated at a higher level than said inflow mouths,
    a chute disposed between said upper edge and said inflow mouths adapted to cause said liquid and said objects to converge toward said inflow mouths,
    said conduits being oriented vertically, the respective inflow mouths being situated at the respective lower end portions thereof, and the respective outflow mouths, situated at the upper end portion of each one of said conduits, are fluidly connected by free gravity fall to
    a sieve, below the outlet mouths, for catching said objects, while allowing liquid to pass through,
    a recovery tank for receiving the liquid passing through the sieve,
    a liquid-recovery conduit connecting said recovery tank to said collecting vessel,
    a pump for transferring liquid from said recovery tank back to said collecting vessel, and
    a transfer chamber upstream of said collecting vessel, said chamber being open at its top, said liquid-recovery conduit opening at the bottom of the transfer chamber, and
    an open flow-way between said transfer chamber and said collecting vessel, said flow-way and said transfer chamber having side and bottom walls whose upper edges lie higher than the upper edges of said collecting vessel.

2. Apparatus for the separation of objects according to claim 1, wherein said wall slopes in a substantially continuous manner towards said upper edge.

3. Apparatus for the separation of objects according to claim 1, wherein said chute comprises plural funnels or channels in a parallel arrangement relative to each other and separated from each other by respective partitioning contours.

4. Apparatus for the separation of objects according to claim 3, wherein said funnels have the narrowest portion thereof situated at the respective lowest point, such that they are able to flow directly into the respective ones of said inlet mouths.

5. Apparatus for the separation of objects according to claim 1, wherein the cross-section area of the passage through which the aggregate of liquid and objects is due to flow above said upper edge of said collecting vessel is sensibly narrower than the average cross-section area of said collecting vessel.

6. Apparatus for the separation of objects according to claim 1, wherein said collecting vessel is formed to substantially feature an upward oriented concavity, preferably in the shape of an open V, and is provided with product loading means adapted to pour said objects to be separated vertically onto the deepest zone of said V-shaped concavity of the collecting vessel.

7. Apparatus for the separation of objects according to claim 6, wherein said product loading means comprise: a loading tank adapted to receive said objects to be separated, a moving conveyor belt, which is partially immersed in said loading tank, and which is provided along the outward facing circumference thereof with a plurality of protruding seizing means so as to be adapted to pick up said objects to be separated from said loading tank and move them above said collecting vessel.

* * * * *